(12) United States Patent
Manneschi

(10) Patent No.: US 11,714,188 B2
(45) Date of Patent: *Aug. 1, 2023

(54) DUAL DETECTOR WITH TRANSVERSE COILS

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 385 days.

This patent is subject to a terminal disclaimer.

(21) Appl. No.: 16/772,342

(22) PCT Filed: Dec. 14, 2018

(86) PCT No.: PCT/EP2018/084936
§ 371 (c)(1),
(2) Date: Jun. 12, 2020

(87) PCT Pub. No.: WO2019/115762
PCT Pub. Date: Jun. 20, 2019

(65) Prior Publication Data
US 2020/0393557 A1    Dec. 17, 2020

(30) Foreign Application Priority Data

Dec. 15, 2017 (FR) ...................... 1762287

(51) Int. Cl.
*G01S 13/88* (2006.01)
*G01V 3/10* (2006.01)
(Continued)

(52) U.S. Cl.
CPC .......... *G01S 13/885* (2013.01); *G01S 13/887* (2013.01); *G01V 3/10* (2013.01); *G01V 3/12* (2013.01); *H01Q 1/40* (2013.01); *F41H 11/136* (2013.01)

(58) Field of Classification Search
CPC .... G01S 13/885; G01S 13/887; G01S 13/878; G01S 13/89; G01S 7/03; G01S 7/282;
(Continued)

(56) References Cited

U.S. PATENT DOCUMENTS 9,733,353 B1 * 8/2017 Carlson .................. G01S 13/88
2009/0288820 A1 * 11/2009 Barron .................. C09K 8/805
166/250.1

(Continued)

FOREIGN PATENT DOCUMENTS

CN         103499842 A  *  1/2014
WO         2012024133 A2    2/2012

OTHER PUBLICATIONS

French Search Report for Application No. 1762287 dated Sep. 7, 2018, 2 pages.

(Continued)

*Primary Examiner* — Olumide Ajibade Akonai
(74) *Attorney, Agent, or Firm* — Lerner David LLP

(57) ABSTRACT

The invention relates to a dual detector comprising a detection head having: an inductive sensor which is mounted on the platform (11) and includes a transmitter coil (12) and a separate receiver coil (13), the transmitter coil (12) and the receiver coil (13) each forming a loop, a soil penetrating radar (60) comprising a transmitter antenna (61) and a receiver antenna (62), the transmitter antenna (61) and the receiver antenna (62) each being accommodated in the center of one of the loops of the transmitter and receiver coils (12) (13), the transmitter antenna (61) and the receiver antenna (62) having a maximum thickness (e) of one micron in order to limit interference with the inductive sensor (12).

10 Claims, 4 Drawing Sheets

(51) Int. Cl.
  *G01V 3/12* (2006.01)
  *H01Q 1/40* (2006.01)
  *F41H 11/136* (2011.01)

(58) Field of Classification Search
  CPC ........... G01S 7/352; G01S 7/027; G01V 3/10;
      G01V 3/12; G01V 3/105; H04B 5/0075;
      H04B 5/0043; H04B 5/00; H04B 5/0081;
        H04B 1/0475; H04B 5/0087; H04B
      5/0093; H01Q 1/40; H01Q 21/065; H01Q
                                 9/0407
  See application file for complete search history.

(56) References Cited

U.S. PATENT DOCUMENTS

| | | | |
|---|---|---|---|
| 2013/0113648 A1* | 5/2013 | Duvoisin, III | G01S 7/354 |
| | | | 342/22 |
| 2017/0060291 A1* | 3/2017 | Chevrier | H03K 17/9537 |
| 2017/0222321 A1* | 8/2017 | Caratelli | H01Q 9/0485 |

OTHER PUBLICATIONS

International Search Report for Application No. PCT/EP2018/084936 dated Feb. 6, 2019, 2 pages.

\* cited by examiner

DUAL DETECTOR WITH TRANSVERSE COILS

CROSS-REFERENCE TO RELATED APPLICATIONS

The present application is a national phase entry under 35 U.S.C § 371 of International Application No. PCT/EP2018/084936 filed Dec. 14, 2018, which claims priority from French Application No. 1762287 filed Dec. 15, 2017, all of which are hereby incorporated herein by reference.

FIELD OF THE INVENTION

The invention relates to the field of the detection of target objects, and more particularly to the detection of explosive charges such as landmines buried in the ground.

TECHNOLOGICAL BACKGROUND

In order to detect explosive charges, it is known to use dual technology detectors ("dual detectors") comprising a detection head housing an inductive sensor and a ground-penetrating radar, insofar as these technologies are complementary as for the types of detected materials (metals for the inductive sensor vs. differences in dielectric constants of the materials and relative position for the radar).

In use, the Applicant has however noticed that the ground was not neutral from an electromagnetic point of view and can therefore disturb the coupling between the windings. In addition, the ground is rarely uniformly magnetic so that, during the scanning of the ground with the detector by an operator, the detected signal can vary only due to the presence of metal debris or to the very composition of the ground, or even trigger false alarms.

In addition, the operators using these detectors may be inadequately trained and may not hold the detector properly or perform an inappropriate scanning motion. The detection head can then form a lateral angle with the ground, so that one of the coils is closer to the ground than the other of the coils, which creates a strong modulation of the signal and therefore risks triggering false alarms. And even if the operator were well trained and tried to keep the detection head substantially parallel to the ground at any point in the scanning motion, he cannot locally modify its inclination to take into account the unevenness in the ground.

In order to overcome these difficulties, manufacturers tend to reduce the sensitivity of these detectors. The risk, however, is that it will no longer be able to detect targets buried in the ground and therefore put the lives of the operators in danger.

Document WO 2012/024133 describes a detector comprising an inductive sensor formed by a transmitting coil and a receiving coil and a radar comprising V-shaped antennas.

SUMMARY OF THE INVENTION

An object of the invention is therefore to propose a dual detector comprising a detection head housing an inductive sensor and another sensor, such as a ground-penetrating radar, which is capable of reducing the false alarms likely to be generated during the scanning of a ground with the detector while having higher sensitivity For this, the invention proposes a dual detector comprising a detection head including:
an inductive sensor and
a ground-penetrating radar comprising a transmitting antenna and a receiving antenna.

The transmitting antenna and the receiving antenna have a thickness less than or equal to one micron in order to limit the interactions with the inductive sensor.

Some preferred but non-limiting characteristics of the dual detector described above are the following, taken individually or in combination:
- the thickness of the transmitting antenna and of the receiving antenna is greater than or equal to one hundred nanometers.
- the thickness of the transmitting antenna and of the receiving antenna is equal to 200 nm.
- the inductive sensor comprises a transmitting coil and a receiving coil distinct from each other, the transmitting coil and the receiving coil each forming a loop, and the transmitting antenna and the receiving antenna are each housed in the center of one of the loops of the transmitting and receiving coils.
- the inductive sensor comprises a transmitting coil and a receiving coil distinct from each other comprising wound wires, the transmitting coil having a greater number of turns than the receiving coil.
- the inductive sensor is printed directly on a platform so that the platform forms a printed circuit.
- the inductive sensor comprises a transmitting coil and a receiving coil distinct from each other, the transmitting coil and the receiving coil being homopolar.
- the transmitting antenna and the receiving antenna of the radar are of one of the following types: quad-ridged horn radio antenna, bow tie antenna, rectangular bow tie antenna, Archimedean spiral antenna, logarithmic spiral antenna, Vivaldi antenna, logarithmic spiral antenna elongated along a fourth axis perpendicular to the first axis.
- the transmitting antenna and the receiving antenna are made at least partly of nickel or chromium. And/or
- a central part of the transmitting antenna and of the receiving antenna is made of copper and comprises, on the surface, a protective layer made of gold.

BRIEF DESCRIPTION OF THE DRAWINGS

Other characteristics, aims and advantages of the present invention will become more apparent upon reading the following detailed description, and in relation to the appended drawings given by way of non-limiting examples and wherein.

DETAILED DESCRIPTION OF ONE EMBODIMENT

Figure 1:
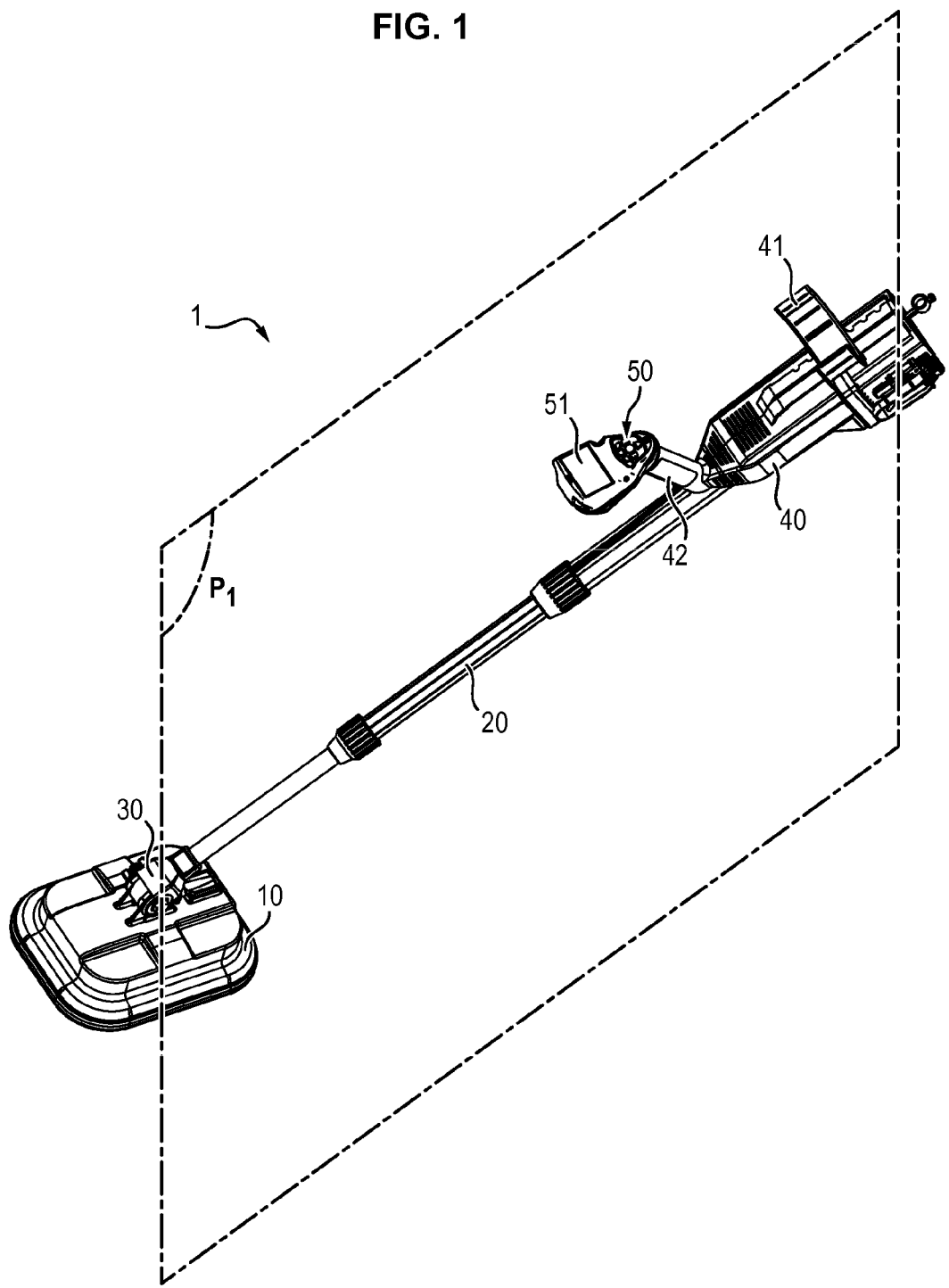
FIG. 1 is a perspective view of an exemplary embodiment of a detector according to the invention.

A dual detector 1 according to the invention comprises a detection head 10.

The detection head 10 corresponds to the part intended to come close to the ground in order to detect target products. To this end, it comprises:
an inductive sensor 12, 13, and a ground-penetrating radar 60 comprising a transmitting antenna 61 and a receiving antenna 62.

The inductive sensor 12, 13 comprises either a single coil forming the transmitter and the receiver, or a transmitting coil 12 and a receiving coil 13, which are distinct from each other. The transmitting coil 12 and the receiving coil then each form a loop and are shaped so that the loop of the transmitting coil 12 at least partially overlaps the loop of the receiving coil 13 so as to form a coupling area 14. This configuration allows obtaining an inductive sensor in which the mutual inductance is minimal.

By way of comparison, compared to an inductive sensor comprising a single coil constituting the transmitter and the receiver and formed of two loops in series of opposite directions in order to neutralize the effects of external interferences, the use of two distinct coils 12, 13 for the transmitting coil 12 and the receiving coil 13 makes it possible to amplify the signal, and therefore does not require decreasing the detection threshold to avoid the risks of false alarms.

In the following, the invention will be more particularly described in the case where the inductive sensor comprises a transmitting coil 12 and a receiving coil 13 distinct from each other. This is however not limiting, the invention also applying in the case of an inductive sensor comprising a single coil.

The transmitting coil 12 and the receiving coil 13 are homopolar windings. They can be fixed on a platform 11, which is fixedly mounted in the detection head 10. The loop of the transmitting coil 12, the coupling area 14 and the loop of the receiving coil 13 have the same longitudinal direction and extend next to each other.

In a manner known per se, the transmitting coil 12 and the receiving coil 13 are configured to transmit and receive waves having a frequency comprised between 300 Hz and 180 kHz.

The transmitting antenna 61 and the receiving antenna 62 of the radar 60 are configured to transmit and receive electromagnetic waves in the ground, for example at a frequency comprised between 100 MHz and 8 GHz. When these waves encounter medium changes, part of the waves is returned to the surface and recorded by the receiving antenna 62.

In order to limit the interactions with the transmitting and receiving coils 12, 13, a thickness e of the transmitting antenna 61 and of the receiving antenna 62 is smaller than a depth of absorption of the electromagnetic waves of the coils 12, 13 so that the antennas 61, 62 become invisible to the magnetic field of the inductive sensor 12, 13. By thickness, it will be understood here the dimension of the antennas in a direction which is substantially normal to the plane containing the platform 11 on which the transmitting 12 and receiving 13 coils are fixed.

However, it should be noted that the thickness e of the transmitting and receiving antennas 12, 13 must remain greater than a threshold thickness to guarantee sufficient mechanical robustness of the antennas 61, 62 and avoid any risk of breakage. The thickness e of the transmitting and receiving antennas 61, 62 is therefore chosen so as to be greater than a hundred nanometers and less than one micron. For example, the transmitting antenna 61 and the receiving antenna 62 may have a thickness e of the order of 200 nm.

In order to produce antennas 61, 62 of this thickness, it is possible in particular to use a Physical Vapor Deposition (PVD) technique. This technique indeed makes it possible to obtain antennas 61, 62 of very small thickness with high dimensional accuracy and to produce several antennas at a time.

Figure 2:
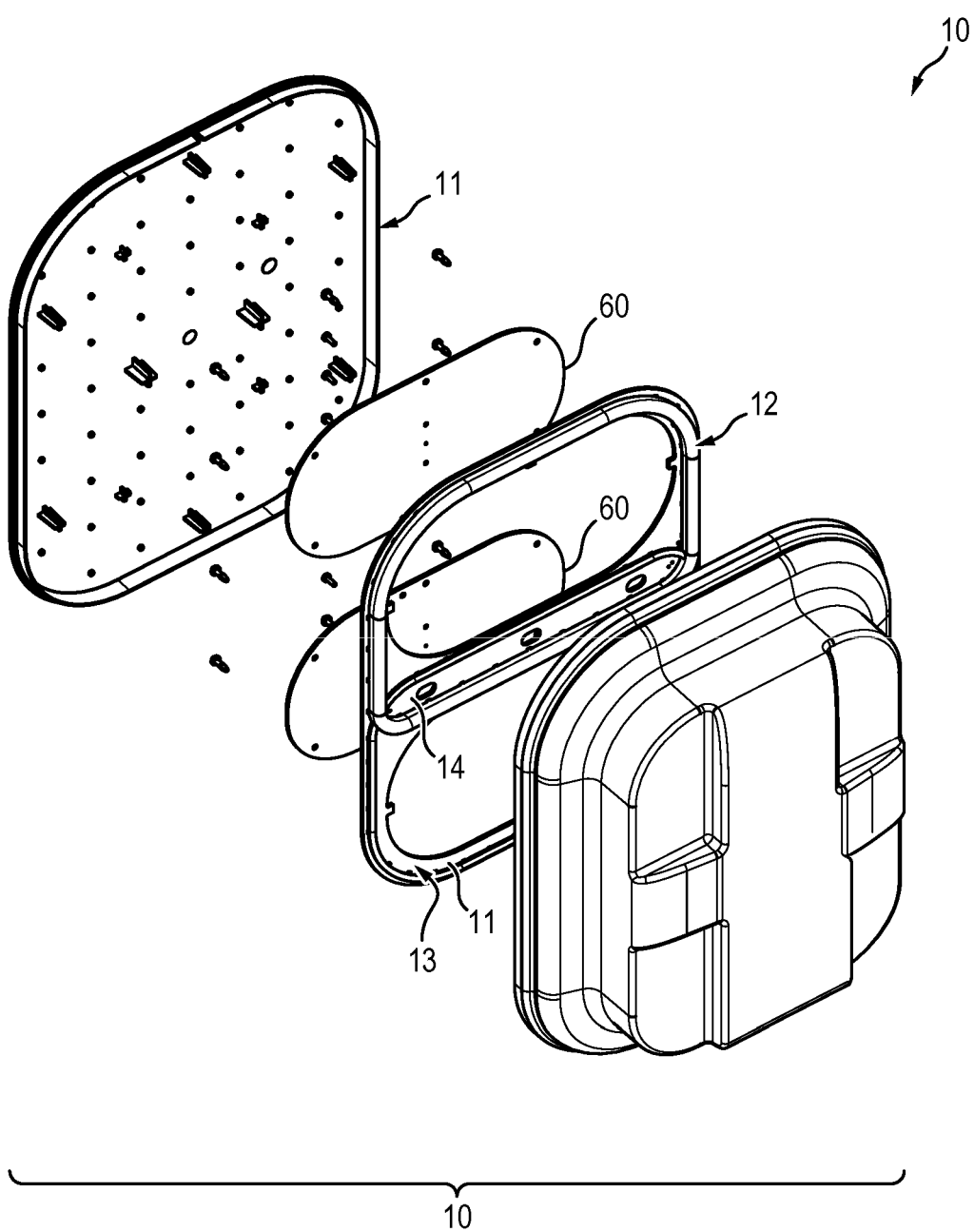
FIG. 2 is an exploded top view in perspective of the detection head of the detector of FIG. 1.
Figure 3:
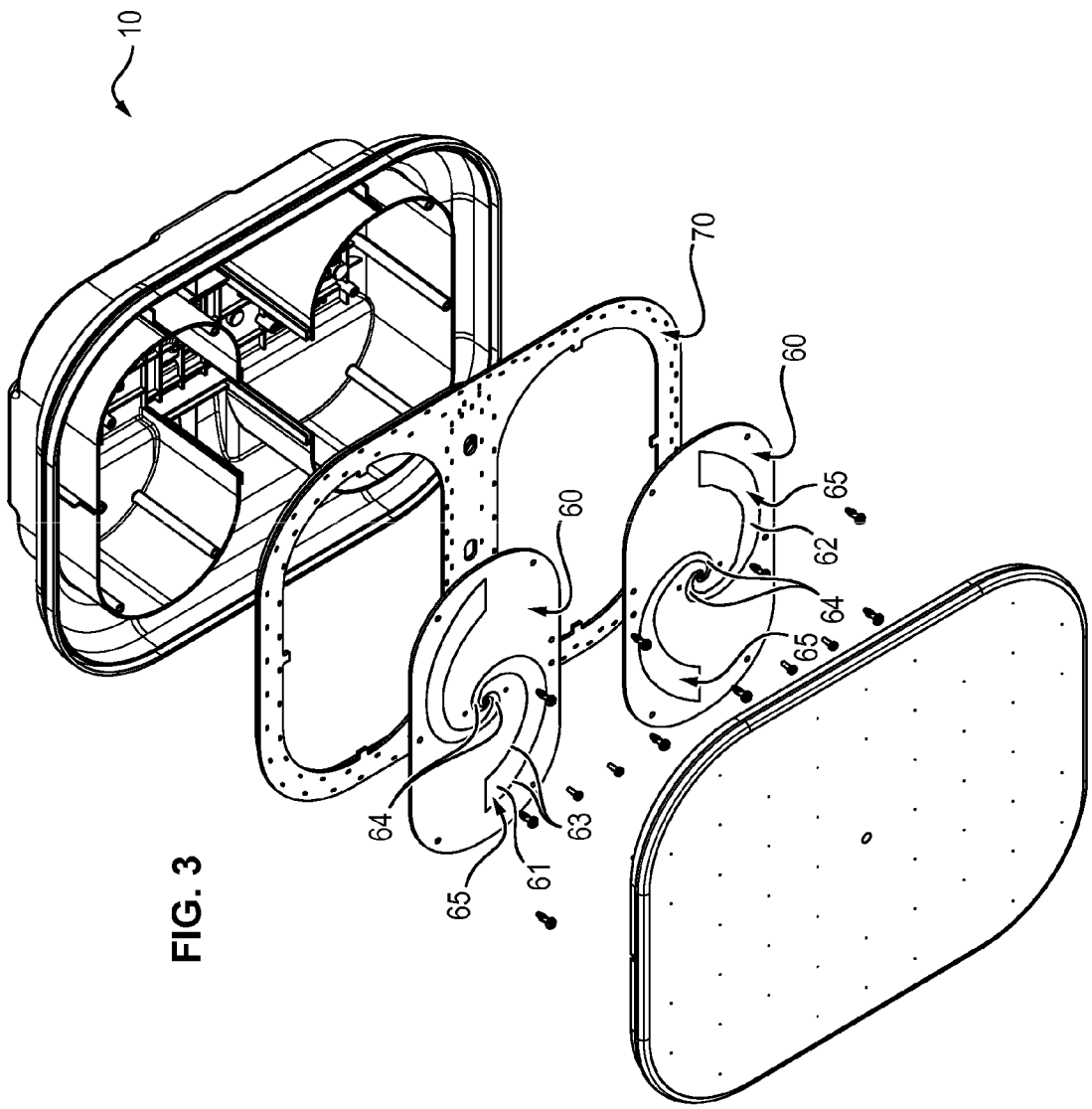
FIG. 3 is an exploded bottom view in perspective of the detection head of the detector of FIG. 1.
Figure 4:
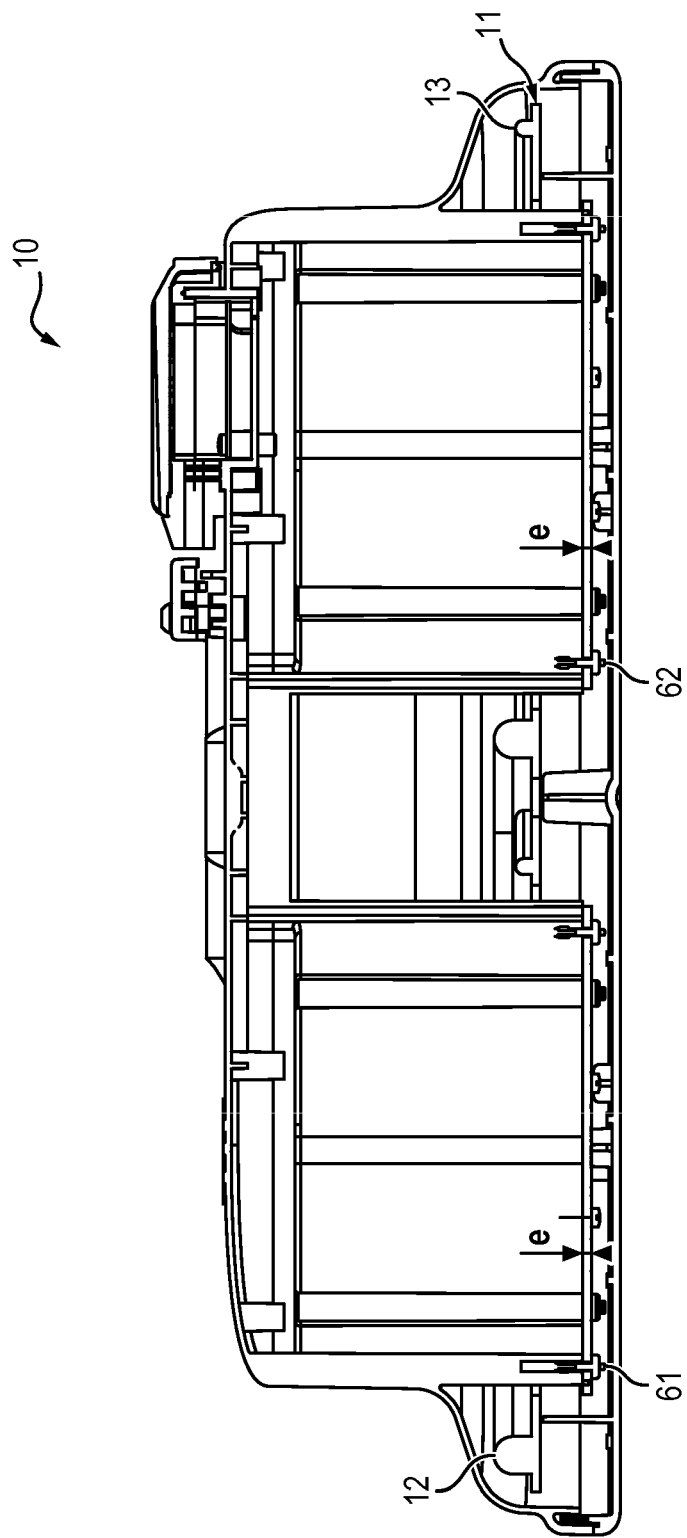
FIG. 4 is a sectional view along the plane P1 of the detection head of the detector of FIG. 1.

In a first embodiment, the transmitting coil 12 and the receiving coil 13 are directly printed on the platform 11. The platform 11 and the transmitting and receiving coils 12, 13 therefore form a printed circuit. This embodiment has the advantage of reducing the compactness of the inductive sensor in the detection head 10 as well as the overall weight of the detector 1. Its cost is however substantial. Consequently, in a second embodiment, which is illustrated in FIGS. 2 to 4, the transmitting coil 12 and the receiving coil 13 may comprise wound wires, the transmitting coil 12 having a greater number of turns than the receiving coil 13.

The detection head is fixed on a handle 20 by means of a mechanical connection 30. The mechanical connection 30 may comprise a built-in, pivot or ball-joint type connection. Preferably, the mechanical connection 30 comprises a pivot connection.

Optionally, the detector 1 also comprises means 40 for the gripping of the detector 1 by an operator. Usually, the gripping means 40 can comprise a hoop 41 configured to slidably receive the arm of the operator and a grip 42 configured to be grasped by the operator.

The handle 20 can be telescopic and/or comprise several distinct parts configured to be assembled with each other before being fixed together, for example by screwing.

In a manner known per se, the detector 1 also comprises processing means 50 comprising in particular a microprocessor configured to process the signal detected by the inductive sensor 12, 13, such as one or several electronic board(s), a memory and if necessary alert means and/or a display device 51.

The processing means 50 can be housed entirely or partially in the gripping means 40.

In one embodiment, the transmitting antenna 61 and the receiving antenna 62 are each housed in the center of one of the loops of the transmitting 12 and receiving 13 coils. The maximum sensitivity of the radar 60 is then in the same area as the maximum sensitivity of the inductive sensor, that is to say at the coupling area 14. In other words, the microwave detection lobes of the radar 60 and the magnetic detection lobes of the inductive sensor 12, 13 match, so that it becomes possible for an operator to consider that the detection of a target takes place in the central area of the detection head 10 during pointing.

The loops of the transmitting coil 12 and of the receiving coil 13 have an elongated shape, that is to say they have a dimension in the plane of the platform 11 which is larger regarding to the other dimension. When the transmitting antenna 61 and the receiving antenna 62 are each housed in the center of one of the loops of the transmitting 12 and receiving 13 coils, the transmitting and receiving 12, 13 antennas 61, 62 also have an elongated shape according to the largest dimension of the loops of the transmitting 12 and receiving 13 coils in order to maximize their radiation surface and therefore their transmission capacity. For example, the transmitting antenna 61 and the receiving antenna 62 can have the shape of a logarithmic spiral which has been lengthened in order to maximize the radiation surface and the gain of the antennas while minimizing the length of each strand 63 forming the spiral of the antennas 61, 62 so as not to increase the pulse. In an elongated logarithmic spiral antenna, the spacing between the strands 63 of the spiral is indeed greater and increases logarithmically. For example, the elongated logarithmic spiral forming the antennas 61, 62 can have a height of about 150 cm for 80 cm. As a variant, the transmitting antenna 61 and the receiving antenna 62 of the radar 60 can be of one of the following types: quad-ridged horn radio antenna, bow tie antenna, rectangular bow tie antenna, Archimedean spiral antenna, logarithmic spiral antenna, Vivaldi antenna.

In a manner known per se, the transmitting antenna 61 and the receiving antenna 62 can be made of copper, which is a good electrical conductor.

However, in order to reduce the risks of oxidation of the antennas, the transmitting and receiving 12, 13 antennas 61, 62 can be partly made of nickel and/or chromium and partly made of copper. Nickel and chromium indeed have the advantage of not oxidizing over time while being electrically conductive.

For example, the center 64 of each antenna 61, 62 can be made of copper and protected by a layer comprising gold, while the rest 65 of the antennas 61, 26 is made of nickel and/or chromium. The zone extending between the between the central part of each antenna 61, 26 and the rest of the antenna 61, 62 can be made of copper and covered with a layer of nickel (and/or chromium).

The invention claimed is:

1. A dual detector comprising a detection head including:
    an inductive sensor comprising a transmitting coil and a receiving coil distinct from each other, wherein the transmitting coil and the receiving coil each form a loop; and
    a ground-penetrating radar comprising a transmitting antenna and a receiving antenna, wherein the transmitting antenna and the receiving antenna each have a thickness less than or equal to one micron in order to limit interactions with the inductive sensor, and wherein the transmitting antenna and the receiving antenna are each respectively housed in a center of the loop of the transmitting coil and the receiving coil.

2. The detector according to claim 1, wherein the thickness of the transmitting antenna and of the receiving antenna is greater than or equal to one hundred nanometers.

3. The detector according to claim 1, wherein the thickness of the transmitting antenna and of the receiving antenna is equal to 200 nm.

4. The detector according to claim 1, wherein transmitting coil and the receiving coil each comprise wound wires, the transmitting coil having a greater number of turns of wound wires than the receiving coil.

5. The detector according to claim 1, wherein the inductive sensor is directly printed on a platform and forms a printed circuit.

6. The detector according to claim 1, wherein the transmitting coil and the receiving coil are homopolar.

7. The detector according to claim 1, wherein the transmitting antenna and the receiving antenna of the radar are of one of the following types: quad—ridged horn radio antenna, bow tie antenna, rectangular bow tie antenna, Archimedean spiral antenna, logarithmic spiral antenna, Vivaldi antenna, or logarithmic spiral antenna elongated along an axis.

8. The detector according to claim 7, wherein the transmitting antenna and the receiving antenna are made at least partly of nickel or chromium.

9. The detector according to claim 8, wherein a central part of the transmitting antenna and of the receiving antenna is made of copper and comprises, on a surface, a protective layer made of gold.

10. A dual detector comprising a detection head including:
    an inductive sensor, wherein the inductive sensor comprises a transmitting coil and a receiving coil distinct from each other and each comprising wound wires, the transmitting coil having a greater number of turns of wound wires than the receiving coil; and
    a ground-penetrating radar comprising a transmitting antenna and a receiving antenna, wherein the transmitting antenna and the receiving antenna have a thickness less than or equal to one micron in order to limit interactions with the inductive sensor.

\* \* \* \* \*